United States Patent [19]
Muhl

[11] 3,809,857
[45] May 7, 1974

[54] TEMPERATURE CONTROL SYSTEM FOR AN ELECTRODE TYPE LIQUID HEATER

[76] Inventor: Andrew H. Muhl, 2109 Huldy, Houston, Tex. 77019

[22] Filed: Jan. 26, 1973

[21] Appl. No.: 326,959

[52] U.S. Cl. ............... 219/286, 219/289, 219/293, 219/295, 338/81, 338/83
[51] Int. Cl. ............................................. H05b 3/60
[58] Field of Search .......................... 219/284–295, 219/271–276; 338/80–86

[56] References Cited
UNITED STATES PATENTS

| | | | |
|---|---|---|---|
| 1,706,146 | 3/1929 | Davidsen | 219/285 UX |
| 1,714,578 | 5/1929 | Weiss | 219/285 |
| 2,090,282 | 8/1937 | Bock | 219/286 |
| 2,428,445 | 10/1947 | Wicks | 219/293 X |
| 3,144,546 | 8/1964 | Foley et al. | 219/285 UX |

*Primary Examiner*—A. Bartis
*Attorney, Agent, or Firm*—W. F. Hyer; Marvin B. Eikenroht

[57] ABSTRACT

An electrode type liquid heater is disclosed which, in one embodiment, includes a tank through which a liquid to be heated, such as water, is passed. A heating assembly including heating electrodes for heating the liquid is placed in the tank and such assembly is movable to move the electrodes into and out of the liquid responsive to shifting of the center of gravity of the assembly. Such shifting is accomplished by a thermostat moving a mass carried by the assembly. The thermostat responds to the temperature of the liquid in the tank to move the mass in one direction to cause movement of the heating electrodes into the liquid for heating, and in another direction to cause movement of the electrodes out of the liquid when a desired liquid temperature is reached. In another embodiment, means are also provided to change the spacing between the electrodes including a thermostat which functions to move an outer electrode farther away from an inner electrode in response to an increase in liquid temperature after liquid flow through the heater stops. This causes the electrodes to move deeper into the body of water to a cooler zone to reduce current flow.

9 Claims, 4 Drawing Figures

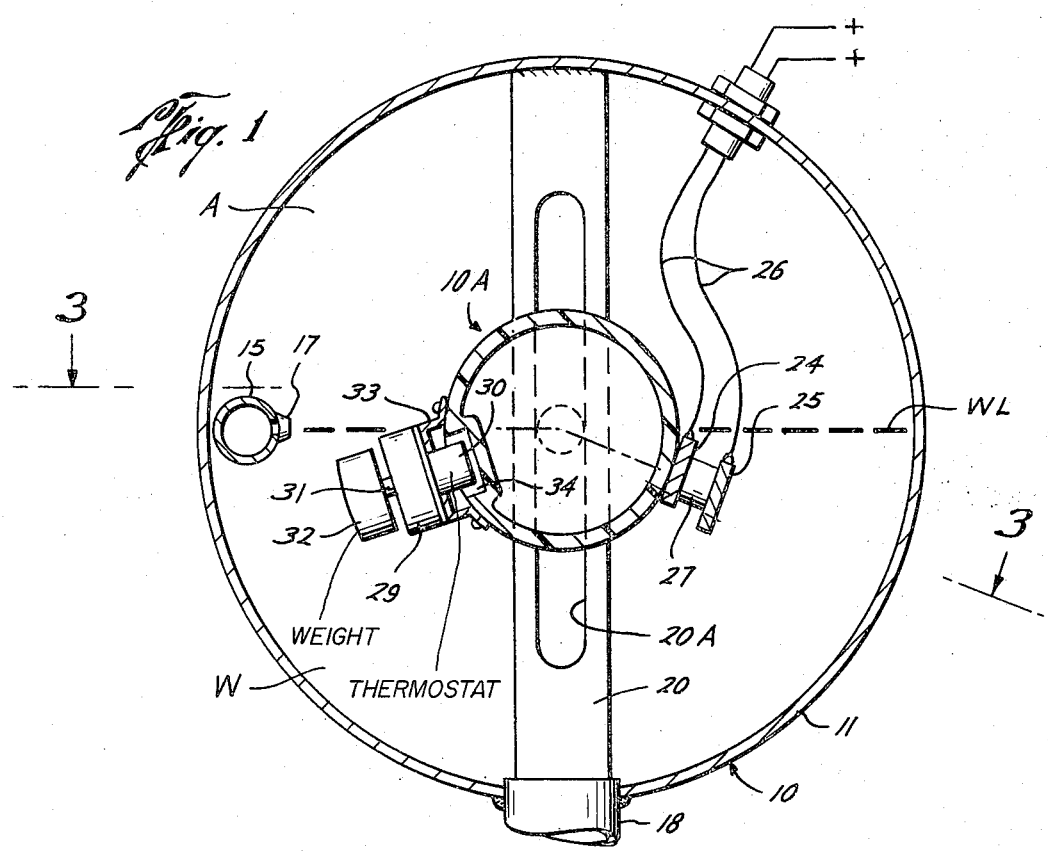
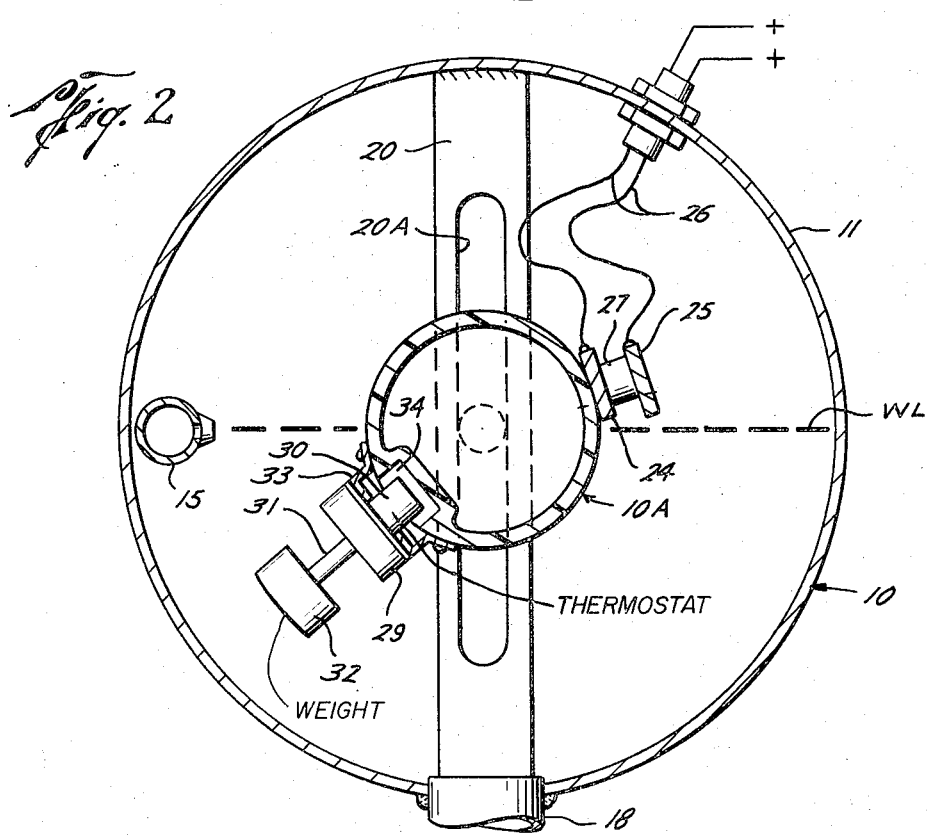

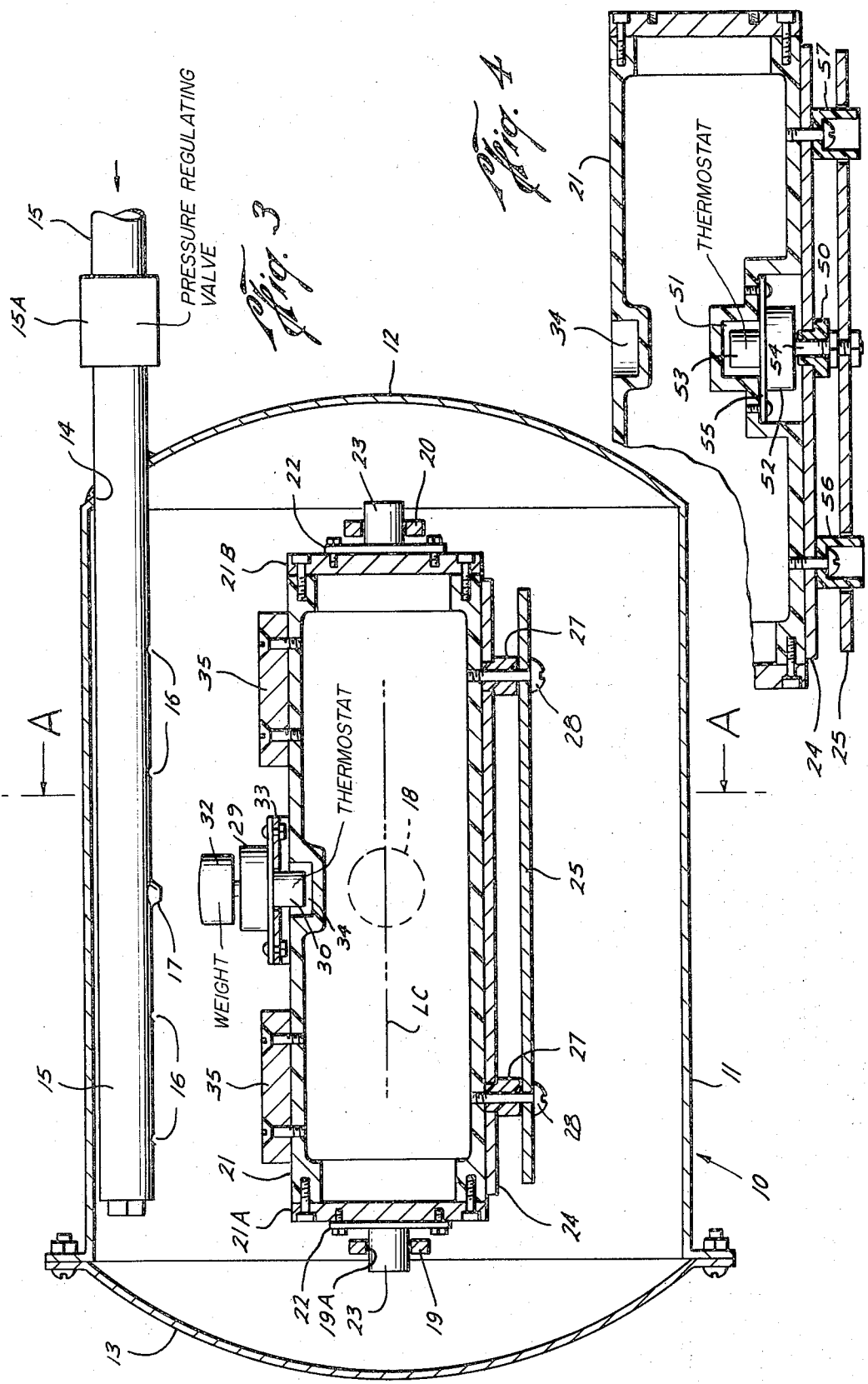

TEMPERATURE CONTROL SYSTEM FOR AN ELECTRODE TYPE LIQUID HEATER

This invention relates to a liquid heater of the electrode type in which liquid is heated by an electrical current passing between electrodes, and in one of its aspects, to an improved liquid temperature control apparatus for such a heater.

Liquid heaters of the type referred to are particularly suitable as water heaters for use in mobile and portable homes, since they do not require the storage and preheating of a large quantity of water. In the electrode type heater, heating electrodes are immersed in the liquid to be heated and heat is generated in the liquid because of the resistance offered by the liquid to the flow of electrical current between the electrodes. In such a heater when hot liquid is demanded, cold liquid flows into the heater, and is almost instantaneously heated, and then flows from the heater for consumption. In the past, a problem in such heaters has been the provision of control apparatus for regulating the temperature of the liquid in the heater. In the conventional control apparatus employed, the heating electrodes remain in the liquid at all times and when heating is required electric current is supplied through the contacts of a thermostatically operated switch. However, during operation of such apparatus, intermittent heavy surges of electrical current and undesirable fluctuations in liquid temperature can occur. In order to reduce such effects, and also to compensate for changes in the dielectric constant of the liquid being heated which may cause the amount of electric current to rise as the liquid become hotter, apparatus such as shown in U. S. Pat. No. 1,424,340 have been suggested which employs electrodes that are movable relative to one another to regulate the current flow. In the U. S. Pat. No. 3,356,827, an insulated shutter arrangement is provided for controlling the flow of current between electrodes immersed in the liquid being heated. In the U. S. Pat. No. 2,812,416, a bellows and linkage arrangement is employed to control the degree of immersion of the electrodes in the water to be heated. In all of these patents, relatively complicated apparatus is provided for causing some relative movement of the electrodes, or of a shutter, in response to temperature, generally making them more expensive than conventional heaters of the thermostatically controlled switch type, and subject to more maintenance.

In the U. S. Pats. Nos. 3,053,964 and 3,144,546, of which the present applicant is co-inventor, control apparatus is disclosed in which either an electrical contact member or the heating electrodes are mechanically moved by a thermostat into and out of water to be heated. While the apparatus in these patents is effective to reduce current and temperature surges, it is believed that the present invention will also effect such a reduction but in a different and improved manner.

It is thus an object of this invention to provide an electrode type liquid heater which is relatively simple and economical to manufacture, and is reliable, so as to be suited for large scale production for various uses such as in portable or mobile homes.

Another object is to provide such a heater in which current and temperature surges are kept reasonably small as compared to prior conventional apparatus, without the use of metallic contacts or mechanical linkages.

Another object is to provide a heater in which the electrodes are moved in and out of the liquid being heated to control the temperature of the liquid, and in which the degree of immersion of the electrodes in the liquid can be controlled as a function of the liquid temperature.

These and other objects, advantages, and features of the invention, are accomplished as illustrated by the preferred embodiments disclosed herein, by an electrode type liquid heater which includes a tank having an inlet and an outlet arranged so that in normal operation of the heater, the tank is partially filled with liquid and there is a body of nonconductive gas above the liquid. A heating assembly is disposed in the tank and, in a more preferred embodiment, the heating assembly includes a buoyant body having sufficient buoyancy to float the entire assembly in a liquid in the tank. At least one, and preferably a plurality, of heating electrodes are carried by the heating assembly and means are supplied for applying a voltage differential across the respective electrodes so that when they are immersed in the liquid, current will flow from one electrode to the other to heat the liquid. The heating assembly is movable (e.g., rotatable) in the tank responsive to a shifting of the assembly's center of gravity from first position wherein an electrode carried by the assembly is at least partially immersed in the liquid in the tank to heat the liquid as aforesaid. The heating assembly can also move to a second position responsive to a shift in its center of gravity wherein the electrode carried thereby is out of the liquid and in the nonconductive gas thereby terminating the flow of current between the electrodes as when the flow through the tank ceases. The heating assembly also includes a means for shifting the center of gravity of the assembly responsive to changes in the temperature of the liquid in the tank to cause the assembly to move between the first and second positions. In a preferred embodiment, this shifting means includes a thermostat carried by the assembly in a position so as to be in the liquid at all times. A shiftable mass is connected to or moved by the thermostat so that when the temperature of the liquid in the tank falls below a predetermined value, as occurs when hot liquid is withdrawn from the tank, the thermostat will shift the mass in a direction to shift the center of gravity of the assembly to cause it to move and immerse the electrode carried thereby in the liquid. When flow of the liquid ceases, the continued heating of the liquid by the immersed electrode will cause the liquid temperature to rise to a point where the thermostat will move the mass in an opposite direction to in turn move the heating assembly to raise the electrode carried thereby out of the liquid and into nonconductive gas thereby stopping the heating action. Since the movement of the electrode in and out of the liquid is gradual, large surges of current are avoided.

In another embodiment, a plurality of electrodes form a part of the heating assembly with the outer electrodes being movable to vary the spacing between the electrodes. Such movement is caused by a thermostat which, when the liquid being heated adjacent to the electrodes has reached a predetermined temperature, will move the outer electrodes away from the inner one thereby shifting the center of gravity of the assembly causing it to move to further immerse the electrodes in the liquid. As a result, the electrodes are moved into a cooler portion of the liquid being heated. Since the conductivity of many liquids, especially water, increases with temperature, this movement of the electrodes into a cooler portion of the liquid in the tank tends to prevent a substantial increase in current flow as would have been the case had the electrodes remained in their original position. This movement of the electrodes to a lower position in the liquid preferably also causes the thermostat controlling movement of the mass upwardly to a higher position in the liquid. The electrodes remain in their lower position until the liquid in the region of the mass controlling thermostat is elevated sufficiently to cause the latter to shift the mass and cause the assembly to move the electrodes out of the liquid into the gas.

In the drawings, wherein like reference numerals are used throughout to designate like parts, and wherein preferred embodiments of the present invention are illustrated;

FIG. 1 is an elevational end view in partial section of a water heater of this invention shown with the heating electrodes in heating position in a body of water being heated and taken generally along the line A—A of FIG. 3;

FIG. 2 is a view similar to FIG. 1 with the heating electrodes shown out of the water, i.e., in a non-heating position;

FIG. 3 is a horizontal view taken generally along the line 3—3 of FIG. 1; and

FIG. 4 is a partial sectional and elevational view showing an alternate arrangement for the heating electrodes;

While reference will hereafter be made to the heating of water, it will be understood that the heater of this invention can be used to heat other suitable liquids.

Referring now to FIGS. 1 and 3, an electrode type heater 10 is illustrated as including a cylindrical tank 11 having a closed ends 12 and 13, one or both of which may be closed by a removable cover such as shown with respect to end 13. Tank 11 includes an inlet opening 14 in end 12 into which an inlet conduit 15 having a plurality of inlet ports 16, and a central inlet nozzle 17 is provided, directed towards the center of the tank. A pressure regulating valve 15A can be provided in inlet conduit 15 and valve 15A is connected to a source of cold water (not shown). The purpose of valve 15A is to prevent pressure surges in the incoming water from being applied to the tank and to minimize changes in liquid level because of such surges. Tank 11 also includes an outlet 18 which will generally be valved (not shown).

The inlet and outlet from the tank are arranged so that in normal operation of the heater, the tank is partially filled with water and there is a body of nonconductive gas above the water. This gas may be air and may include some electrolysis products. Thus the outlet 18 is situated below the liquid surface WL and preferably is from the lower part of the tank. It has been found that the location of the inlet largely determines the water level in that the level of the liquid in the tank will tend to be about the same as that of the inlet. Therefore, it is preferred that the inlet (ports 16 and nozzle 17) be at about the midpoint between the top and bottom of the tank as shown in FIGS. 1 and 2.

A pair of support guides 19 and 20 are mounted adjacent opposite ends 12 and 13 of tank 11. The support guides have an elongated slotted opening 19A and 20A, respectively. A heating assembly 10A is disposed between support guides 19 and 20, and in the preferred embodiment illustrated in FIGS. 1–3, includes a hollow buoyant cylinder 21, which is closed at each of its ends by plates 21A and 21B to be water tight. Cylinder 21, is preferably made of a reinforced plastic, such as a fiber glass reinforced plastic, or other light, noncorrosive material. A hub 22 is attached to each of ends 21A and 21B, and short shafts 23 extend from hubs 22, along the central longitudinal axis LC of cylinder 21, into slots 19A and 20A with a sliding relationship so that cylinder 21 can move up and down guides 19 and 20 (as viewed in FIGS. 1 and 2) with shafts 23 sliding in slots 19A and 20A, and cylinder 21 should be free to rotate about axis LC. Since cylinder 21 is buoyant, it will float at the water level, and move up and down in tank 11 with changes in the level of water in the tank. Normally, the changes in water level will be quite small. Although the arrangement described is preferred, the principles of this invention can be utilized with other forms of heating element 10A.

Heating assembly 10A is shown as including a pair of electrodes 24 and 25, which are connected by suitable electrical leads 26 to a source of electrical current (not shown). As illustrated in FIGS. 1 and 3, each of electrodes 24 and 25 are flat plates extending along a substantial part of the length of cylinder 21 and parallel to axis LC. The electrodes are spaced from each other by insulated spacers 27, and the electrodes and spacers are mounted on the outside surface of cylinder 21 by screws 28, as shown in FIG. 3. Electrode 24 is preferably longer than electrode 25 and extends beyond each end of electrode 25, as shown in FIG. 3. The electrodes 24 and 25 are preferably circumferentially offset from each other about the surface of cylinder 21 as shown in FIGS. 1 and 2. The longitudinal and circumferential offset relationship of the electrodes described, which provides an offset of all edges of the electrodes with respect to each other is preferred because it eleminates build up of deposits on the electrodes in that the flow of water carried by the flow of electrical current tends to sweep away any such deposits as they are formed. By way of example, an offset of about three-eighths inches for all edges of the electrodes may be satisfactory.

As illustrated in FIGS. 1 and 2, electrodes 24 and 25 are mounted on cylinder 21 so that they can be moved into and out of the water in tank 11 by rotation of cylinder 21 about axis LC. For this purpose, heating assembly 10A also includes a weighted thermostat 29 mounted on cylinder 21 so that electrodes 24 and 25 are counterbalanced on cylinder 21 by weighted thermostat 29, and the rotation of cylinder 21 is controlled by a shift in the center of gravity of heating a assembly 10A in response to temperature of the water. In the embodiment illustrated, thermostat 29 may be a conventional automotive thermostat including a temperature sensing member 30, and a plunger rod 31, with an added weight 32 mounted on the plunger rod 31. Thermostat 29 is mounted on the opposite side of the outer circumference of cylinder 21 from electrodes 24 and 25. When the water temperature in tank 11 is cold, thermostat 29 responds so that weight 32 is moved into a position close to the body of thermostat 29 (see FIG. 1), and when water in the tank is heated to about the rated value of the thermostat, the weight moves out until it is in the position of FIG. 2 with weight 32 at its furtherest position from body 29. The outside wall of cylinder 21 includes a recess 34, at about the mid point of its length and on the opposite side of cylinder 21 from electrodes 24 and 25, for example, at about 160° around the circumference of cylinder 21 from electrodes 24 and 25. Thermostat 29 is mounted on a support bracket 33 which mounts the thermostat over recess 34. Thermostat 29 is positioned on cylinder 21 such that when weight 32 is in its innermost position of FIG. 1, electrodes 24 and 25 are rotated below the water surface and thermostat is at or near the water surface, and when weight 32 is in its outermost position in FIG. 2, electrodes 24 and 25 are rotated out of the water due to a shift in the center of gravity of heating assembly 10A.

Thus it will be seen that the heating assembly is movable in the tank responsive to a shifting of its center of gravity between a first position wherein an electrode carried thereby is at least partially immersed in the water in the tank for heating of the water and a second position wherein such electrode is out of the water and in the nonconductive gas, such positions being respectively such as shown in FIGS. 1 and 2. It will be noted that the temperature sensitive portion of the thermostat is in the water at all times. Also, the heating assembly includes a means for so shifting the center of gravity of the assembly responsive to changes in temperature of the water to cause the assembly to move between such first and second positions.

While the thermostat shown in the drawings is of the type having a piston and piston rod moved by an expansible medium, other types can be used such as an expansible filled bellows, a bimetallic thermostat, etc., as long as it is capable of moving the weight 32 the required distance. The weight 32 can be unitary as shown or it can be any mass which can be actuated so as to shift the center of gravity of the heating assembly, as for example, a volume of mercury in a tiltable tube. Also, while only two electrodes are shown, which may be connected to a 110 volt or to a 220 volt single phase current source, three spaced electrodes could be used connected to a 220 three phase current source. Other arrangements and numbers of electrodes, as well as other types of current sources can be used if desired. Also, as shown in FIG. 3, additional counterweights 35 may be mounted on cylinder 21 when required and when needed to balance the float so that the required control by thermostat 29 is provided.

In operation, assuming that water has been previously stored in tank 11 to water level WL and heated sufficiently so that the electrodes 24 and 25 are out of the water (FIG. 2), when the water is drawn from outlet 18, cold water will flow into tank 11 through ports 16 and nozzle 17. It is preferred that nozzle 17 be directed in the direction of thermostat 29 so that cold water will quickly flow into recess 34 and about temperature sensitive element 30 to cause weight 32 to move into its inward position as in FIG. 1; moving electrodes 24 and 25 down into the water for heating. As demand for water continues, the electrodes will remain in the water and will heat water flowing through tank 11. However, when demand ceases, and cold water is no longer entering ports 16 and nozzle 17, then the rated temperature of thermostat 29 will be reached causing weight 32 to move away from cylinder 21 and the electrodes will move to the FIG. 2 position.

The termperature rating of the thermostat should be selected to be higher than the temperature of the heated water being discharged from the heater. For example, if the desired hot water temperature is in the range of 140° to 150° F., the thermostat may be selected to function at about 180° F.

Referring now to FIG. 4, an alternative embodiment of this invention is disclosed in which means is provided for changing the spacing between the electrodes 24 and 25 and the rotational position of heating assembly 10A in response to an increase in liquid temperature after flow through the heater stops and while the remaining liquid is being heated sufficiently to cause thermostat 29 to function. Thus, when flow stops, the temperature of the water in the vicinity of the electrodes in their FIG. 1 position will increase and this changes the dielectric constant of the water so as to permit greater amounts of current to flow. To avoid the resulting surge of current, the outer electrode 25 is moved outwardly in response to this increase in temperature thereby causing the heating assembly to rotate so as to increase the depth of immersion of the electrodes and place them in a cooler portion of the water in the tank. As shown in FIG. 4, electrode 24 is mounted on cylinder 21 and has a hole in its center in which an insulated bushing 50 is mounted. Cylinder 21 includes a recess 51 located mid way along its length. A thermostat 52, which may also be an automotive type thermostat having a sensing element 53 and a plunger rod 54, is mounted in recess 51 on a plate 55, with a clearance about sensing element 53 of the thermostat so that water can flow around sensing element 53. Plunger rod 54 of thermostat 52 extends through bushing 50 and is connected to electrode 25. Electrode 25 is guided near its ends by insulated bushings 56 and 57 passing through holes in electrode 25 so that it can move toward and away from electrode 24 under control of thermostat 52. The minimum spacing between electrodes is maintained by a shoulder on bushing 50 and a nut connecting rod 54 to plate 25. As shown in FIGS. 1-3, the heating electrodes preferably are mounted generally on the opposite side of cylinder 21 from weighted thermostat 29. In the FIG. 4 embodiment, thermostat 29 should be rated at a higher temperature than thermostat 52, for example, 180° vs. 160°.

When hot water demand ceases, the electrodes are in the water near the surface WL as shown in FIG. 1 and this water will be at a temperature below that required to actuate thermostat 29. As the heating continues, the temperatures at the electrodes increases and current flow likewise increases. Thus for example, with a demand temperature of 140°-150°F., water near the electrodes, while they are in their FIG. 1 position may be somewhat greater than the demand temperature while an inch or so below this level, the water temperature may be 5° or so lower. When the temperature of the water near line WL reaches the rated temperature of thermostat 52 (160° in the example), electrode 25 will be moved by thermostat 52 further away from electrode 24 to reduce the current flow and also cause a shift in the center of gravity of heating assembly 10A so that the electrodes are rotated further in the water to a cooler water level (i.e., 155° F. in the example given). When the heated water reaches the rated temperature of thermostat 29, electrodes 24 and 25 are rotated out of the water as previously described. When thermostat 52 cools, electrode plate 25 will be moved back toward electrode plate 24, readying the heating assembly for another heating cycle when hot water is required.

Thus, with the apparatus described a relatively simple, inexpensive and efficient liquid heater is provided which can be readily mass produced. Only a few moving parts are required and current and temperature surges are reduced to minimize wear and maintenance problems.

While reference has been made to the fact that the instant heater is especially adapted for use in mobile and portable homes, it can also be used in many other types of installations to derive benefit from its advantages. Also, the heating assembly can be used to heat liquids in open tanks or vessels.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

The invention having been described, what is claimed is:

1. An electrode type liquid heater comprising, in combination; a tank having an inlet and an outlet arranged so that in the normal operation of the heater, the tank is partially filled with electrically conductive liquid and there is a body of electrically nonconductive gas above the liquid; a heating assembly; a plurality of spaced heating electrodes at least one of which is carried by said heating assembly; means for applying a voltage differential across the respective electrodes; said heating assembly being movable in said tank in response to a shift of its center of gravity between a first position wherein the at least one electrode carried thereby is at least partially immersed in the liquid in the tank for heating of said liquid and a second position wherein the at least one electrode carried thereby is out of said liquid and in said nonconductive gas; said heater assembly also including temperature responsive means for so shifting the center of gravity of the assembly in response to changes in the temperature of a liquid in the tank to cause the assembly to move between said first and second positions.

2. The liquid heater of claim 1 wherein said heating assembly includes a buoyant body having sufficient buoyancy to float the heating assembly in the liquid in said tank.

3. The liquid heater of claim 2 wherein the temperature responsive means for shifting the center of gravity includes a mass moveable from one position to another position to cause the heating assembly to move between said first and second positions and a thermostat operable to so move the mass, said thermostat having a heat sensing means situated so as to be within the liquid in said tank when the heating assembly is in either of its first or second positions.

4. The liquid heater of claim 3 wherein said mass is a unitary weight.

5. The liquid heater of claim 1 wherein the heating assembly includes an elongated buoyant body having sufficient buoyancy to float the heating assembly in the liquid in said tank and wherein a plurality of said electrodes are carried by said buoyant body, and means restraining lateral movement of the buoyant body to prevent said electrodes from touching the tank while permitting vertical movement of the body as the level of the liquid in said tank varies.

6. The liquid heater of claim 5 wherein said electrodes are plates mounted so that at least one edge of one plate is offset laterally with respect to the corresponding edge of another plate.

7. The liquid heater of claim 1 wherein at least an inner and outer electrode is carried by said heating assembly and wherein temperature responsive means are provided for causing outward movement of said outer electrode to increase the spacing between said electrodes in response to an increase in temperature of a liquid in said tank, such increase in spacing causing the heating assembly to move to increase the depth of immersion of said electrodes in a liquid in said tank.

8. A heating assembly which comprises a buoyant supporting body having sufficient buoyancy to float the heating assembly in a liquid to be heated; at least one heating electrode carried by said body; the body being adapted to be moved responsive to a shifting of its center of gravity between first and second positions to raise and lower the at least one electrode carried thereby relative to the surface of the liquid; and temperature responsive means for so shifting the center of gravity of the body responsive to changes in the temperature of a liquid which the heating assembly is being used to heat.

9. The heating assembly of claim 8 wherein the means for shifting the center of gravity includes a mass moveable from one position to another position to cause the body to move between said first and second positions and a thermostat operable to so move the mass, said thermostat having a heat sensing means situated so as to be within a liquid to be heated at all times during use of the heating assembly.

* * * * *